Dec. 28, 1926.

K. S. JOHNSON

ELECTRIC WAVE TRANSMISSION

Filed March 9, 1923

*Inventor:*
*Kenneth S. Johnson,*
by *Atty.*

Dec. 28, 1926.

K. S. JOHNSON

ELECTRIC WAVE TRANSMISSION

Filed March 9, 1923    3 Sheets-Sheet 2

1,611,916

Inventor:
Kenneth S. Johnson,
by *Joel A.R. Palmer* Att'y.

Dec. 28, 1926. 1,611,916

K. S. JOHNSON

ELECTRIC WAVE TRANSMISSION

Filed March 9, 1923 3 Sheets-Sheet 3

Inventor:
Kenneth S. Johnson,
by  Atty.

Patented Dec. 28, 1926.

1,611,916

UNITED STATES PATENT OFFICE.

KENNETH S. JOHNSON, OF JERSEY CITY, NEW JERSEY, ASSIGNOR TO WESTERN ELECTRIC COMPANY, INCORPORATED, OF NEW YORK, N. Y., A CORPORATION OF NEW YORK.

ELECTRIC-WAVE TRANSMISSION.

Application filed March 9, 1923. Serial No. 623,834.

The invention relates to artificial lines and more particularly to electric wave filters and has for its object to transmit currents comprising a plurality of frequencies with an attenuation varying with the frequency.

In the preferred application of the invention, a band of frequencies is transmitted with negligible attenuation while frequencies of an adjacent band or bands are substantially suppressed.

In accordance with the invention, a section of an artificial line, such as a wave filter, comprises in general four impedance paths, three of which are arranged in the form of a T network with the fourth path bridged across the transverse arms of the T. The impedances of this network, which for convenience, will be referred to as a bridged T network bear a definite relationship to a network of the series shunt type, the characteristics of which are well known.

In the forms of the invention described herein, the arms of the bridged T network consist of substantially pure reactances. Its most useful forms are found to be wave filter networks in which there is substantially infinite attenuation at a frequency within the band to be suppressed and the network may be designed so that this frequency is very near the cut-off frequency of the filter, thus producing a very sharp separation between the transmitted and suppressed bands.

While in general the characteristics of the bridged T networks are the same as corresponding networks of the series shunt type, the values of the individual impedances are generally different, and in certain conditions the bridged T network is found to be more economical or more efficient by reason of having inductances or condensers of sizes which can be more easily or more efficiently manufactured.

Figure 4:
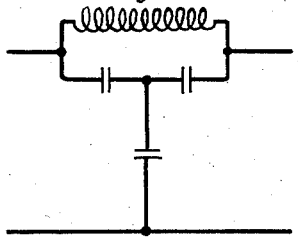
Figure 4A:
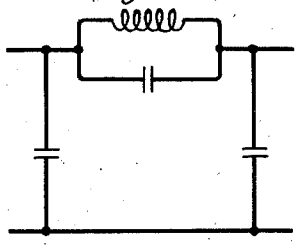
Figure 4B:
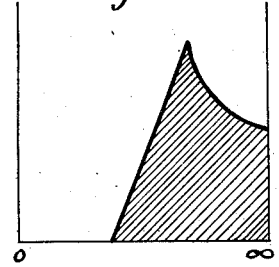
Figure 8:
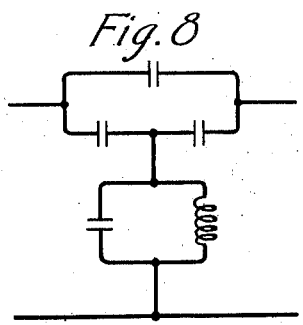
Figure 8A:
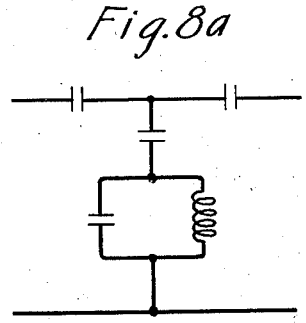
Figure 8B:
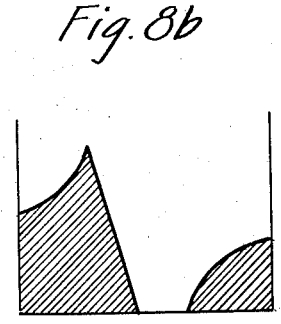

This application is a continuation in part, of my application, Serial No. 434,388, filed December 31, 1920, for "electric wave filters", in Figs. 4 and 8 of which two forms of the invention are illustrated.

Figure 1:
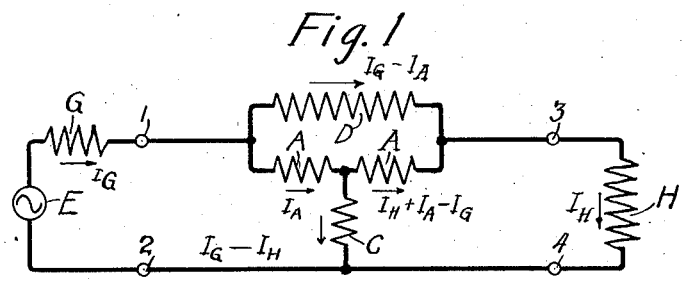
Figure 2:
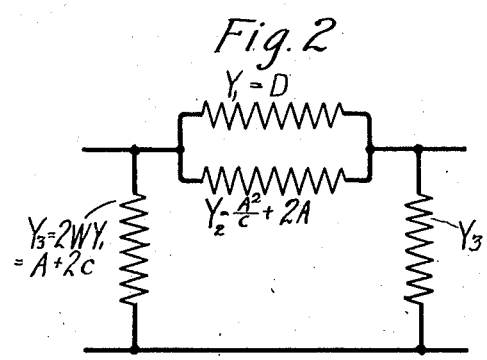
Figure 3:
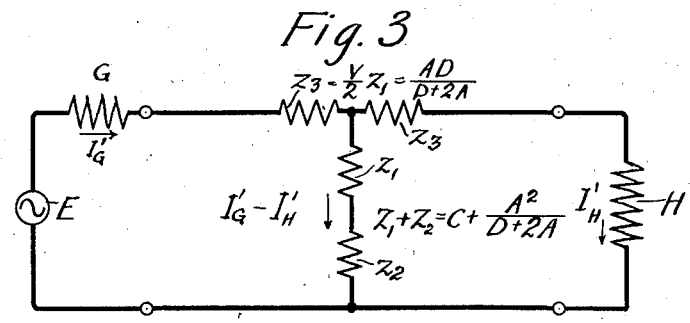
Figure 5:
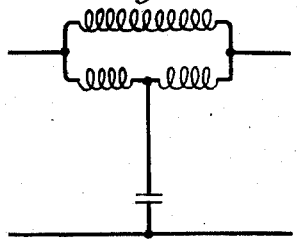
Figure 5A:
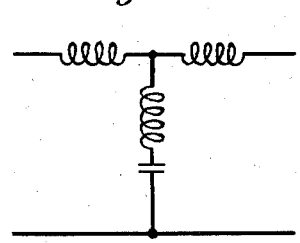
Figure 6:
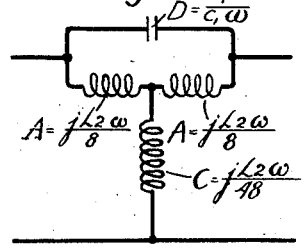
Figure 6A:
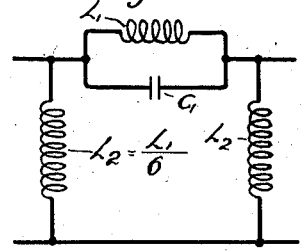
Figure 6B:
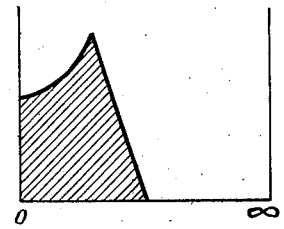
Figure 12:
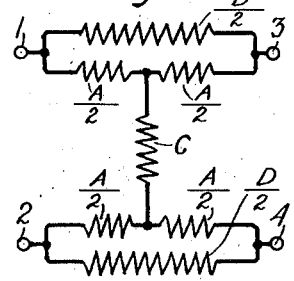
Figure 9:
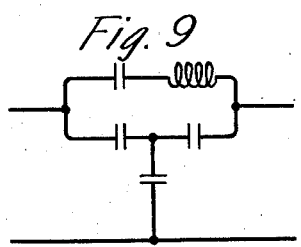
Figure 9A:
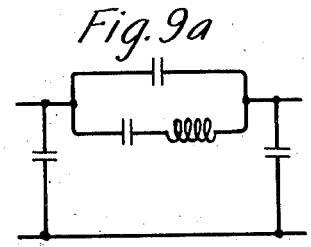
Figure 9B:
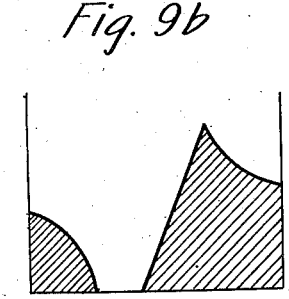
Figure 10:
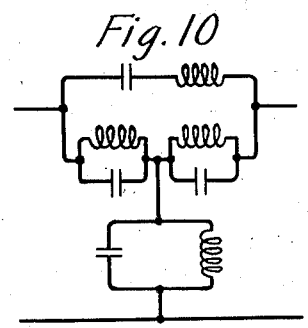
Figure 10A:
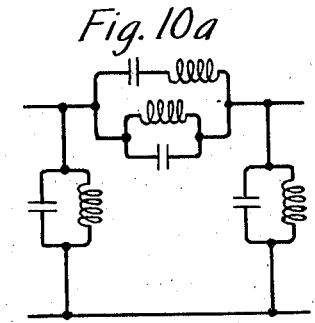
Figure 10B:
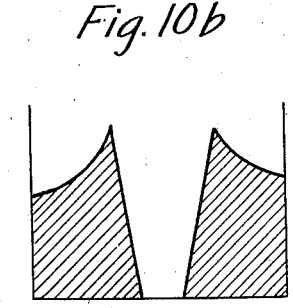
Figure 11:
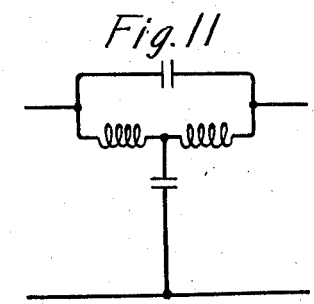
Figure 11A:
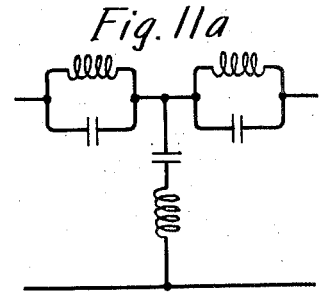
Figure 11B:
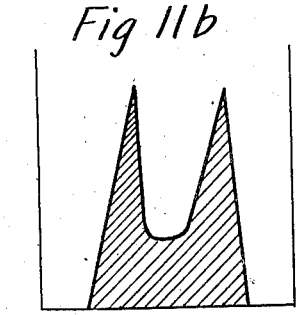

The invention will be more fully understood from the following detailed description and claims taken in connection with the accompanying drawings in which Fig. 1 is a schematic drawing illustrating the invention generally. Figs. 2 and 3 show series shunt networks which are equivalents of Fig. 1. Figs. 4 to 11, inclusive, show various forms which the invention may assume. Figs. 4$^a$ to 10$^a$, inclusive, show series shunt filter circuits which are equivalents of Figs. 4 to 10 respectively. Fig. 11$^a$ shows a series shunt filter circuit which is the equivalent of Fig. 11 as to attenuation. Fig. 4$^b$ is a curve showing the attenuation characteristics of Figs. 4 and 5. Fig. 6$^b$ is a similar curve corresponding to Figs. 6 and 7. Figs. 8$^b$ to 11$^b$ show the attenuation characteristics of Figs. 8 to 11 inclusive. Fig. 12 shows a modification of Fig. 1, in which the network is balanced with respect to the line.

In the curves, the shaded area represents loss or attenuation the abscissæ being units of frequency and the ordinates being units of attenuation, the peaks representing the frequency at which infinite attenuation would occur in the theoretical case of pure reactances.

The invention is shown in its general form in the network between terminals 1 and 2 and terminals 3 and 4 in Fig. 1, a shunt impedance C having one terminal connected between two equal impedances A, and an impedance D being connected across both impedances A. For convenience in designing circuits of this form, the network may be converted into the equivalent network of the so-called series-shunt type, examples of which together with design formulæ therefor may be found in the patent to George A. Campbell No. 1,493,600, issued May 13, 1924. Reference is also made to an article by O. J. Zobel on "Theory and design of uniform and composite electric wave filters", Bell System Technical Journal Vol. II page 1, January 1, 1923.

If A, C and D represent the values of the respective impedances in Fig. 1, and if the T network in Fig. 3 be made with series impedances $Z_3$, each having the value $$\frac{AD}{D+2A}$$

and with total shunt impedance $Z_1 + Z_2$ having the value $$C + \frac{A^2}{D+2A},$$

the two networks will be the full electrical equivalents of each other both as regards currents propagated therethrough and as regards the impedances represented at their terminals. This may be proven as follows:

Connect an electromotive force E acting in series through an impedance G to terminals 1 and 2 and connect an impedance H to terminals 3 and 4. Call the current through G, $I_G$, the current through the first A, $I_A$ and the current through H, $I_H$. Then, as indicated on the drawing, the current through D will be $I_G-I_A$, the current through C will be $I_G-I_H$, and the current through the second A will be $I_H+I_A-I_G$. Equating the potential drops in accordance with Kirchhoff's second law:

$$E = I_G G + I_A A + (I_G - I_H) C \quad (1)$$
$$(I_G - I_A) D = I_A A + (I_H + I_A - I_G) A \quad (2)$$
$$(I_H + I_A - I_G) A + I_H H = (I_G - I_H) C \quad (3)$$

Solving (1), (2) and (3) for $I_G$, the current entering the network, and $I_H$, the current leaving the network:

$$I_G = \frac{E[(D+2A)(A+C+H)-A^2]}{K} \quad (4)$$

$$I_H = \frac{E[A^2+C(D+2A)]}{K} \quad (5)$$

in each of which $K=(D+2A)(GC+GH+CH)+A(A+D)(G+H)+AD(A+2C)$.

Apply the same external circuit conditions to the T network of Fig. 3 and call the current entering the network $I'_G$ and the current leaving the network $I'_H$. Then the current through the shunt impedance will be $I'_G-I'_H$. By Kirchhoff's second law:

$$E = I'_G\left(G+\frac{AD}{D+2A}\right)+(I'_G-I'_H)\left(C+\frac{A^2}{D+2A}\right) \quad (6)$$

$$(I'_G-I'_H)\left(C+\frac{A^2}{D+2A}\right) = I'_H\left(H+\frac{AD}{D+2A}\right) \quad (7)$$

Solving (6) and (7) simultaneously for $I'_G$ and $I'_H$, $$I'_G = \frac{E[(D+2A)(A+C+H)-A^2]}{K} \quad (8)$$

$$I'_H = \frac{E[A^2+C(D+2A)]}{K} \quad (9)$$

in each of which $K=(D+2A)(GC+GH+CH)+A(A+D)(G+H)+AD(A+2C)$.

Since the value of $I'_G$ is identical with that of $I_G$ and the value of $I'_H$ is identical with the value of $I_H$, it follows that the respective networks are electrically the full equivalents of each other.

Filter sections of the form of the network in Fig. 3 frequently have a series arm $Z_3$ having the physical properties of a portion of the shunt arm. The value of $Z_3$ may, therefore, be expressed as $$\frac{V}{2}Z_1.$$

Then if C be made equal to $Z_2$, the values of A, C and D may be expressed in terms of $Z_1$ and $Z_2$. That is, from the simultaneous equations $$Z_1+Z_2 = C + \frac{A^2}{D+2A},$$

$$\frac{V}{2}Z_1 = \frac{AD}{D+2A},$$

and $$Z_2 = C,$$

we obtain the values:

$$A = \frac{V+4}{2}Z_1 \quad (10)$$

$$C = Z_2, \quad (11)$$

and $$D = \left(V+\frac{V^2}{4}\right)Z_1 \quad (12)$$

By similar methods it can be shown that the network of Fig. 1 is the full equivalent of the $\pi$ network in Fig. 2, if the latter have impedances, as shown, $$Y_1 = D, \quad Y_2 = \frac{A^2}{C}+2A,$$

and $$Y_3 = A+2C.$$

If $Y_3$ be expressed as $2WY_1$, the values of A, B and C in terms of $Y_1$ and $Y_2$ will be:

$$A = \frac{2W}{1+4W}Y_2, \quad (13)$$

$$C = \frac{4W^2}{1+4W}Y_2, \quad (14)$$

and $$D = Y_1 \quad (15)$$

Figure 7:
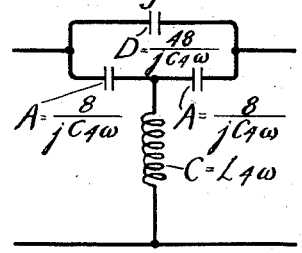
Figure 7A:
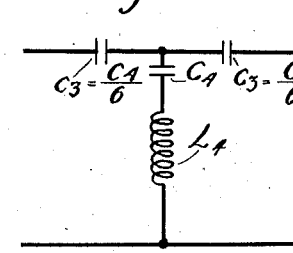

Assume now that a high pass filter having the attenuation characteristics shown in Fig. 6$^b$ is required. Fig. 7$^a$ which corresponds to Fig. 7 of the Campbell application above referred to, is known to have these characteristics. Suppose that on computing the values of the condensers $C_3$ and $C_4$, it is found that $C_3$ has a capacity of one microfarad and $C_4$ has a capacity of 6 microfarads. Then the value of V will be $$V = \frac{2Z_3}{Z_1} = \frac{\frac{2}{jC_3\omega}}{\frac{1}{jC_4\omega}} = \frac{2C_4}{C_3} = 12.$$

Applying formulæ (10), (11) and (12), we find the arms of the bridged T network of Fig. 1 to be:

$$A = \frac{8}{jC_4\omega}, \quad C = jL_4\omega, \quad \text{and} \quad D = \frac{48}{jC_4\omega},$$

as shown in Fig. 7.

It is seen that C is an inductance having the same value as $L_4$ in Fig. 7ª; each arm A is a condenser having a value of $\frac{C_4}{8}$ or .75 mf. and D is a condenser having a value of $\frac{C_4}{48}$ or .125 mf. The total capacity of the section in Fig. 7 is 1.625 mf., as compared with a total capacity of 8 mf. in Fig. 7ª. Since the cost of mica condensers in sizes above .1 mf. varies approximately directly with their size, a considerable saving is obtained by using the type of Fig. 7. It will be found that with the ratios of $C_3$ to $C_4$ most likely to be encountered in practice, the condensers of Fig. 7 will be generally much smaller than those of Fig. 7ª.

Referring now to Figs. 6 and 6ª, which have the same attenuation characteristics as Figs. 7 and 7ª, assume that the same relation between the cut off frequency and the frequency of maximum attenuation is desired as in the above example. It will be found that $L_2$ in Fig. 6ª must equal $\frac{L_1}{6}$. The value of W is:

$$W = \frac{Y_3}{2Y_1} = \frac{jL_2\omega}{2jL_1\omega} = \frac{L_2}{2L_1} = \frac{1}{12}$$

Applying formulæ (13), (14) and (15), we find the arms of the bridged T network of Fig. 1 to have the following impedances:

$$A = \frac{jL_1\omega}{8}, \quad C = \frac{jL_1\omega}{48},$$

and $$D = \frac{1}{jC_1\omega},$$

as shown in Fig. 6. The condenser is the same as in Fig. 6ª and the inductances are considerably smaller and cheaper.

It is believed to be unnecessary to describe in detail the other figures of the drawings. It is apparent from the corresponding curves that Figs. 4 and 5 are low pass filters which, if desired, may be connected in tandem with filter sections, like those in corresponding Figs. 4ª and 5ª or with other sections having the same terminal impedance. Figs. 8 and 9 are band pass filters having a sharp cut-off at one side of the transmitted band. Fig. 10 is a band pass filter having sharp cut-offs at both sides of the transmitted band and Fig. 11 is a band suppression filter having sharp cut-offs at both sides of the suppressed band.

In Fig. 12 is shown a balanced network, which is the equivalent of Fig. 1 when the cross arms of the double T have values of $\frac{A}{2}$ respectively and the bridge arms have values of $\frac{D}{2}$ respectively.

While certain forms of the invention have been illustrated and described, it is obvious that the invention may assume other forms within the spirit of the appended claims. In certain of the claims, the expression "bridged T network" is employed to define a network having at least a part thereof arranged as in Fig. 1.

The invention claimed is:

1. An electrical network comprising a pair of input terminals and a pair of output terminals, an impedance path connected directly between an input terminal and an output terminal, a pair of impedance paths having a common terminal and having their other terminals connected respectively to the terminals of said first path, and a fourth impedance path having one terminal connected to said common terminal and having connections from its other terminal to the remaining input terminal and output terminal, each of said paths containing a substantial amount of reactance, the impedances of said network having such values that said network is the equivalent of a series-shunt network having desired transmission characteristics.

2. A network as in claim 1 in which the impedances of said paths are substantially wholly reactive.

3. A network as in claim 1 in which the impedances of said paths have such values that said network transmits band of frequencies with negligible attenuation and substantially suppresses an adjacent band of frequencies.

4. A network as in claim 1 in which three impedance paths are connected between said remaining input and output terminals and to said fourth impedance path in the same manner as said first three paths.

5. An electric wave filter section comprising four impedance paths each containing a substantial amount of reactance arranged in the form of a bridged T, the value of the impedances of said paths being so proportioned that said network transmits a band of frequencies with negligible attenuation and substantially suppresses frequencies lying outside said band.

6. An electric wave filter section comprising four impedance paths arranged in the form of a bridged T, three of said paths consisting of one kind of reactance and the fourth of said paths consisting of reactance of the opposite sign.

7. A high pass wave filter section comprising an inductance and two condensers arranged in the form of a T, and a third condenser bridged across said first two condensers.

8. An electrical network comprising four impedance paths arranged in a bridged T, all of said paths consisting of substantial amounts of reactance.

In witness whereof, I hereunto subscribe my name this 7th day of March, A. D. 1923.

KENNETH S. JOHNSON.